United States Patent
Kawakita

(10) Patent No.: US 10,052,917 B2
(45) Date of Patent: Aug. 21, 2018

(54) PNEUMATIC TIRE

(71) Applicant: BRIDGESTONE CORPORATION, Chuo-ku, Tokyo (JP)

(72) Inventor: Akihiro Kawakita, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 392 days.

(21) Appl. No.: 14/896,923

(22) PCT Filed: Apr. 4, 2014

(86) PCT No.: PCT/JP2014/060034
§ 371 (c)(1),
(2) Date: Dec. 9, 2015

(87) PCT Pub. No.: WO2014/199708
PCT Pub. Date: Dec. 18, 2014

(65) Prior Publication Data
US 2016/0152086 A1    Jun. 2, 2016

(30) Foreign Application Priority Data

Jun. 11, 2013  (JP) ................................. 2013-123098

(51) Int. Cl.
*B60C 11/11* (2006.01)
*B60C 11/03* (2006.01)
(Continued)

(52) U.S. Cl.
CPC ...... *B60C 11/0309* (2013.01); *B60C 11/0327* (2013.01); *B60C 11/11* (2013.01);
(Continued)

(58) Field of Classification Search
CPC . B60C 11/1376; B60C 11/0309; B60C 11/11; B60C 11/1307
See application file for complete search history.

(56) References Cited

U.S. PATENT DOCUMENTS 4,423,760 A * 1/1984 Treves .................. B60C 11/042
152/209.21
2008/0073012 A1* 3/2008 Miyazaki ............ B60C 11/0311
152/209.19

FOREIGN PATENT DOCUMENTS

EP     2099622 A    9/2009
EP     2374636 A    10/2011
(Continued)

OTHER PUBLICATIONS

Machine translation for Japan 2001-187520 (Year: 2018).*
(Continued)

*Primary Examiner* — Steven D Maki
(74) *Attorney, Agent, or Firm* — SOLARIS Intellectual Property Group, PLLC

(57) ABSTRACT

Heel-and-toe wear can be suppressed while securing snow performance. Includes: a block (14) that is provided at a tread (16), and that is demarcated by mutually intersecting circumferential direction main grooves (22) and lateral main grooves (24) (main grooves) respectively extending around a tire circumferential direction and along a tire width direction; a first step portion (11) that extends along a wall portion (14F) at one tire circumferential direction side of the block (14), and that has a height from a groove bottom (24A) of the lateral main groove (24) (main groove) where the one side wall portion (14F) is present, which is lower than a tread face (14A); and a second step portion (12) that extends along a side wall portion (14R) at another tire circumferential direction side of the block (14), that has a height from a groove bottom (24A) of the lateral main groove (24) (main groove) where the other side wall portion (14R) is present, which is lower than the tread face (14A), and that has a smaller width than the first step portion (11).

10 Claims, 5 Drawing Sheets

(51) Int. Cl.
*B60C 11/13* (2006.01)
*B60C 11/12* (2006.01)

(52) U.S. Cl.
CPC ...... *B60C 11/1307* (2013.01); *B60C 11/1376* (2013.01); *B60C 2011/0334* (2013.01); *B60C 2011/0341* (2013.01); *B60C 2011/1213* (2013.01)

(56) References Cited

FOREIGN PATENT DOCUMENTS

| JP | 61-060308 A | * | 3/1986 |
| JP | 62-151101 U | * | 9/1987 |
| JP | S62-151101 U | | 9/1987 |
| JP | 02-303906 A | * | 12/1990 |
| JP | 05-338413 A | * | 12/1993 |
| JP | 07-096716 A | * | 4/1995 |
| JP | H11-240314 A | | 9/1999 |
| JP | 2001-187520 A | * | 7/2001 |
| JP | 2001-187520 A | | 7/2001 |
| JP | 2006-137230 A | | 6/2006 |
| JP | 2011-046223 A | | 3/2011 |
| JP | 2011-051431 A | | 3/2011 |

OTHER PUBLICATIONS

Machine translation for Japan 07-096716 (Year: 2018).*
Machine translation for Japan 05-338413 (Year: 2018).*
Machine translation for Japan 02-303906 (Year: 2018).*
Translation for Japan 62-151101 U (Year: 2013).*
Machine translation for Japan 61-060308 (Year: 2018).*

* cited by examiner

PNEUMATIC TIRE

TECHNICAL FIELD

The present invention relates to a pneumatic tire, and in particular to a pneumatic tire that takes into consideration travel over snow.

BACKGROUND ART

Japanese Patent Application Laid-Open (JP-A) No. 2006-137230 describes a pneumatic tire provided with a block that generates torque about a direction normal to a road surface when compressed. In this block, the angle of a groove wall at a kick-out end gradually increases on progression toward the tire width direction outside, the angle of a groove wall at a dig-in end gradually decreases on progression toward the width direction outside, and the angle of a groove wall on a tire circumferential direction groove side gradually decreases on progression along the rotation direction. A front face of the block is accordingly disposed with a twisted structure with respect to bottom faces of the grooves.

SUMMARY OF INVENTION

Technical Problem

However, the conventional example above is not a pneumatic tire that takes into consideration travel over snow.

In pneumatic snow tires, sometimes high braking performance and handling stability performance is demanded as well as snow performance. Snow performance, particularly where it relates to acceleration performance, can be improved by increasing the width of lug grooves. However, in such cases, since each individual block becomes smaller, the block rigidity is reduced, and it becomes difficult to secure braking performance and handling stability performance on dry road surfaces.

Moreover, if sufficient block rigidity is not secured, when traction or braking force acts on the tire, portions of the blocks with comparatively low rigidity are dragged against the road surface, causing heel-and-toe wear of the blocks.

In consideration of the above circumstances, an object of the present invention is to enable heel-and-toe wear to be suppressed while securing snow performance.

Solution to Problem

A pneumatic tire according to a first aspect of the present invention is configured for use on snowy roads, and includes: a block that is provided at a tread, and that is demarcated by mutually intersecting main grooves respectively extending around a tire circumferential direction and along a tire width direction; a first step portion that extends along a side wall portion at one tire circumferential direction side of the block, and that has a height from a groove bottom of the main groove where the one side wall portion is present, which is lower than a tread face and higher than the groove bottom; and a second step portion that extends along a side wall portion at another tire circumferential direction side of the block, that has a height from a groove bottom of the main groove where the other side wall portion is present, which is lower than the tread face and higher than the groove bottom, and that has a smaller width than the first step portion.

In this pneumatic tire, the first step portion is provided at the one tire circumferential direction side wall portion of the block of the tread, and the second step portion is provided at the other side wall portion. The first step portion and the second step portion are set a level lower than the tread face, thereby securing a greater volume for the main grooves and increasing the shear force from snow columns in the main grooves, thereby enabling snow performance to be secured.

The width of the second step portion is set smaller than the width of the first step portion, securing the rigidity of the second step portion side of the block. Accordingly, when traction or braking force acts on the tire, deformation of the second step portion side of the block is suppressed even when the block is dragged against the road surface. This thereby suppresses heel-and-toe wear.

A second aspect of the present invention is the pneumatic tire of the first aspect, wherein the height of the second step portion from the groove bottom is greater than or equal to the height of the first step portion.

In this pneumatic tire, the height of the second step portion is greater than or equal to the height of the first step portion. The rigidity of the second step portion side of the block is secured at, or greater than, that of the first step portion side. Accordingly, when traction or braking force acts on the tire, deformation of the second step portion side of the block is suppressed even when the block is dragged against the road surface. This thereby suppresses heel-and-toe wear.

A third aspect of the present invention is the pneumatic tire of either the first aspect or the second aspect, wherein: the first step portion is provided on a dig-in side of the block; and the second step portion is provided on a kick-out side of the block.

Here, the dig-in side is the side of the block that contacts the road surface first when the tire rotates in a specific direction, and the kick-out side is the side of the block that is last to make contact (the side that is last to leave the road surface).

In this pneumatic tire, the first step portion is provided on the dig-in side of the block, and the second step portion that has a narrower width than the first step portion is provided on the kick-out side of the block. Accordingly, the kick-out side of the block has higher rigidity than the dig-in side. Accordingly, when traction acts on the tire, deformation of the kick-out side of the block is suppressed, enabling heel-and-toe wear to be suppressed.

A fourth aspect of the present invention is the pneumatic tire of any one of the first aspect to the third aspect, wherein: the block includes an acute angle portion at a position on the second step portion side of the block where an acute angle of intersection is formed between the main grooves; and the width of the second step portion is such that one end positioned on the acute angle portion side is smaller than another end positioned on an opposite side from the acute angle portion side.

In this pneumatic tire, the acute angle portion is provided at a position on the second step portion side of the block, and the width of the one end of the second step portion positioned on the acute angle portion side is set smaller than the width of the other end positioned on the opposite side from the acute angle portion, thereby securing the rigidity of the acute angle portion. Accordingly, when traction or braking force acts on the tire, deformation of the acute angle portion of the block is suppressed even when the block is dragged against the road surface. This thereby enables heel-and-toe wear to be suppressed even when the block includes the acute angle portion.

A fifth aspect of the present invention is the pneumatic tire of the fourth aspect, wherein the width of the second step portion gradually decreases on progression from the other end toward the one end.

In this pneumatic tire, the width of the second step portion gradually decreases on progression from the one end toward the other end, thereby enabling a gentle change in the block rigidity along the second step portion.

A sixth aspect of the present invention is the pneumatic tire of either the fourth aspect or the fifth aspect, wherein the height of the second step portion from the groove bottom is higher at the one end than at the other end.

In this pneumatic tire, the height of the second step portion from the groove bottom of the main groove is set greater at the one end than at the other end, thereby further securing the rigidity of the acute angle portion. Accordingly, when traction or braking force acts on the tire, deformation of the acute angle portion of the block is further suppressed. This thereby enables heel-and-toe wear to be further suppressed at the block provided with the acute angle portion on the second step portion side.

A seventh aspect of the present invention is the pneumatic tire of the sixth aspect, wherein the height of the second step portion from the groove bottom gradually increases on progression from the other end toward the one end.

In this pneumatic tire, the height of the second step portion gradually increases on progression from the other end toward the one end, thereby enabling a gentle change in the block rigidity along the second step portion.

An eighth aspect of the present invention is the pneumatic tire of any one of the first aspect to the seventh aspect, wherein the height of the second step portion from the groove bottom is from 50% to 80% of the height from the groove bottom to the tread face.

Here, the lower limit is set at 50% since below this value, the block rigidity becomes difficult to secure, and the upper limit is set at 80% since above this value, the increase in the volume of the main grooves becomes small.

In this pneumatic tire, the height of the second step portion from the groove bottom is from 50% to 80% of a height from the groove bottom to the tread face, thereby enabling heel-and-toe wear to be even further suppressed, while improving snow performance.

A ninth aspect of the present invention is the pneumatic tire of any one of the first aspect to the eighth aspect, wherein the main groove extending around the tire circumferential direction is inclined with respect to the tire circumferential direction, and the pneumatic tire further includes: a third step portion that extends along a side wall portion at one tire width direction side of the block, and that has a height from a groove bottom of the main groove where the one side wall portion is present, which is lower than the tread face and higher than the groove bottom; and a fourth step portion that extends along a side wall portion at another tire width direction side of the block, that has a height from a groove bottom of the main groove where the other side wall portion is present, which is lower than the tread face and higher than the groove bottom, and that has a smaller width than the third step portion.

In this pneumatic tire, the third step portion and the fourth step portion are provided at the side wall portions on both tire width direction sides of the block, and the rigidity of the block is secured on the fourth step portion side. This thereby enables heel-and-toe wear to be suppressed, even when a tire width direction component arises in the block due to force received from the road surface when travelling.

A tenth aspect of the present invention is the pneumatic tire of the ninth aspect, wherein: an acute angle portion is provided at a position on the fourth step portion side of the block where an acute angle of intersection is formed between the main grooves; and the width of the fourth step portion is such that one end positioned on the acute angle portion side is smaller than another end positioned on an opposite side from the acute angle portion side.

In this pneumatic tire, the acute angle portion is provided at a position on the fourth step portion side of the block, and the width of the one end of the fourth step portion on the acute angle portion side is set smaller than the width of the other end on the opposite side from the acute angle portion, thereby securing the rigidity of the acute angle portion. Accordingly, when traction or braking force acts on the tire, deformation of the acute angle portion of the block is suppressed even when the block is dragged against the road surface. This thereby enables heel-and-toe wear to be suppressed even when the block includes the acute angle portion on the fourth step portion side.

An eleventh aspect of the present invention is the pneumatic tire of the tenth aspect, wherein the width of the fourth step portion gradually decreases on progression from the other end toward the one end.

In this pneumatic tire, the width of the fourth step portion gradually decreases on progression from the one end toward the other end, thereby enabling a gentle change in the block rigidity along the fourth step portion.

A twelfth aspect of the present invention is the pneumatic tire of either the tenth aspect or the eleventh aspect, wherein the height of the fourth step portion from the groove bottom is higher at the one end than at the other end.

In this pneumatic tire, the height of the fourth step portion from the groove bottom of the main groove is set greater at the one end than at the other end, thereby further securing the rigidity of the acute angle portion. Accordingly, when traction or braking force acts on the tire, deformation of the acute angle portion of the block is further suppressed. This thereby enables heel-and-toe wear to be even further suppressed in the block provided with the acute angle portion on the fourth step portion side.

A thirteenth aspect of the present invention is the pneumatic tire of the twelfth aspect, wherein the height of the fourth step portion from the groove bottom gradually increases on progression from the other end toward the one end.

In this pneumatic tire, the height of the fourth step portion gradually increases on progression from the other end toward the one end, thereby enabling a gentle change in the block rigidity along the fourth step portion.

Advantageous Effects of Invention

As described above, the pneumatic tire according to the present invention obtains the excellent advantageous effects of enabling heel-and-toe wear to be suppressed, while securing snow performance.

BRIEF DESCRIPTION OF DRAWINGS

FIG. 4 is a plan view illustrating a block of a pneumatic tire.

FIG. 5A is an enlarged cross-section illustrating a first step portion and a second step portion provided at a block, as viewed in the direction of arrows 5A-5A in FIG. 4.

FIG. 5B is an enlarged view illustrating a second step portion provided at a block, as viewed along arrow 5B in FIG. 4.

DESCRIPTION OF EMBODIMENTS

Figure 1A:
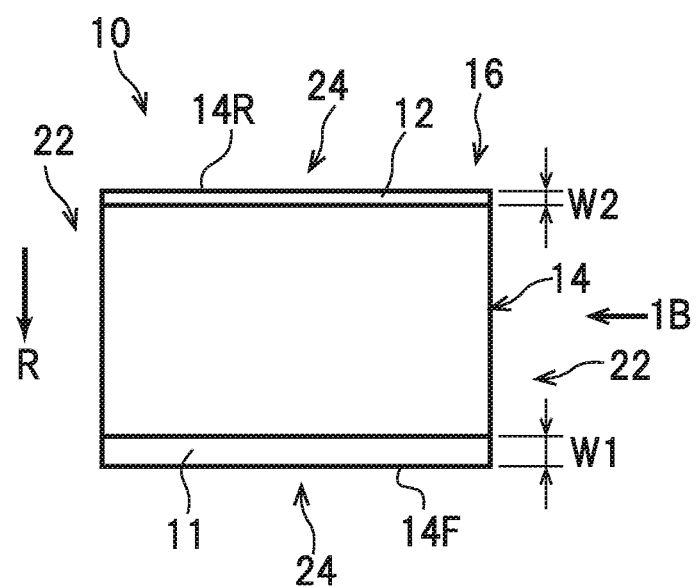
FIG. 1A is a plan view illustrating a block of a pneumatic tire according to a first exemplary embodiment.

Explanation follows regarding exemplary embodiments of the present invention, with reference to the drawings.

First Exemplary Embodiment

FIG. 1 illustrates a pneumatic tire 10 according to the present exemplary embodiment, this being a snow tire including blocks 14, a first step portion 11 extending along each block 14, and a second step portion 12 extending along each block 14. Although plural of the blocks 14 are provided at a tread 16, only one of the blocks 14 is illustrated in the drawings. The first step portion 11 and the second step portion 12 are configured integrally to the block 14.

The blocks 14 are provided at the tread 16, and are demarcated by mutually intersecting main grooves that respectively extend around the tire circumferential direction and along the tire width direction. The main grooves are, for example, configured by circumferential direction main grooves 22, and lateral main grooves 24. In the present exemplary embodiment, the circumferential direction main grooves 22 extend parallel to the tire circumferential direction, and the lateral main grooves 24 extend parallel to the tire width direction. Each block 14 accordingly has a substantially rectangular shape in plan view.

The first step portion 11 extends along a side wall portion 14F at one tire circumferential direction side of the block 14, for example on the dig-in side in a tire rotation direction R. A height H1 of the first step portion 11 from a groove bottom 24A of the lateral main groove 24 on the side wall portion 14F on the dig-in side is set lower than a tread face 14A, and higher than the groove bottom 24A. Specifically, in FIG. 1B, H1<H when H is a height of the tread face 14A of the block 14 from the groove bottom 24A.

The dig-in side refers to the side of the block 14 that contacts the road surface first in the tire rotation direction R.

The second step portion 12 extends along a side wall portion 14R at another tire circumferential direction side of the block 14, for example on the kick-out side. A height H2 of the second step portion 12 from the groove bottom 24A of the lateral main groove 24 where the side wall portion 14R on the kick-out side is present is set lower than the tread face 14A, and higher than the groove bottom 24A. Namely, in FIG. 1B, H2<H.

The kick-out side refers to the side of the block 14 that is last to make contact (the side that is last to leave the road surface) in the tire rotation direction R.

The height H1 of the first step portion 11 from the groove bottom 24A and the height H2 of the second step portion 12 from the groove bottom 24A are both from 50% to 80% of the height H from the groove bottom 24A to the tread face 14A. The lower limit is set at 50% since below this value, the block rigidity becomes difficult to secure, and the upper limit is set at 80% since above this value, the increase in the volume of the lateral main grooves 24 becomes small.

The height H2 of the second step portion 12 from the groove bottom 24A is greater than or equal to the height H1 of the first step portion 11, and the rigidity on the second step portion 12 side of the block 14 is secured at that of the first step portion 11 side or greater. The relationship in size between the heights H1, H2 is more preferably H2>H1. This thereby enables greater rigidity to be secured on the kick-out side of the block 14.

The second step portion 12 has a smaller width than the first step portion 11. More specifically, in FIG. 1A, W2<W1 when the width of the second step portion 12 is denoted W2, and the width of the first step portion 11 is denoted W1. Note that the widths W1, W2 respectively refer to the width in the tire circumferential direction in the cases of the first step portion 11 and the second step portion 12 that extend along the lateral main grooves 24.

Operation

Figure 1B:
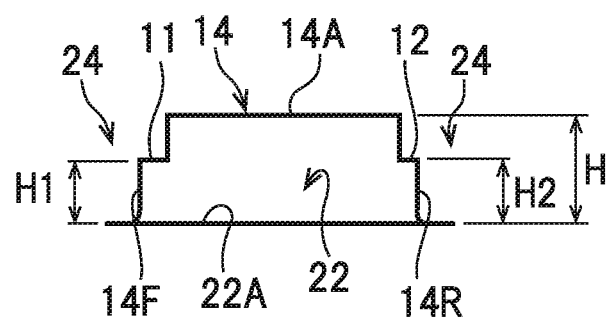
FIG. 1B is a drawing illustrating a first step portion and a second step portion provided at a block, as viewed along arrow 1B in FIG. 1A.

Explanation follows regarding operation of the present exemplary embodiment configured as described above. In FIG. 1A and FIG. 1B, the pneumatic tire 10 according to the present exemplary embodiment is provided with the first step portion 11 and the second step portion 12 on each block 14 of the tread 16, and the first step portion 11 and the second step portion 12 are both set at a level lower than the tread face 14A. Moreover, the width W1 of the first step portion 11 is set larger than the width W2 of the second step portion 12. This secures a greater volume for the lateral main grooves 24, and increases the shear force from snow columns in the lateral main grooves 24, thereby enabling snow performance to be secured.

The width W2 of the second step portion 12 is set smaller than the width W1 of the first step portion 11, and the rigidity of the second step portion 12 side (kick-out side) of the block 14 is higher than that of the first step portion 11 side (dig-in side). Accordingly, when traction or braking force acts on the pneumatic tire 10, deformation of the second step portion 12 side (kick-out side) of the block 14 is suppressed even when the block 14 is dragged against the road surface. This thereby suppresses heel-and-toe wear of the pneumatic tire 10.

In particular, the height H2 of the second step portion 12 from the groove bottom 24A is set at from 50% to 80% of the height H from the groove bottom 24A to the tread face, thereby enabling heel-and-toe wear to be more effectively suppressed, while improving snow performance.

Second Exemplary Embodiment

Figure 2A:
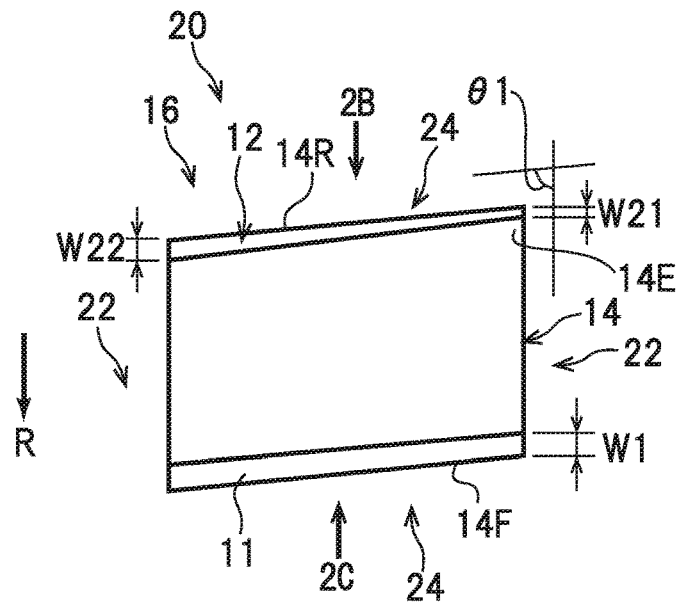
FIG. 2A is a plan view illustrating a block of a pneumatic tire according to a second exemplary embodiment.
Figure 2B:
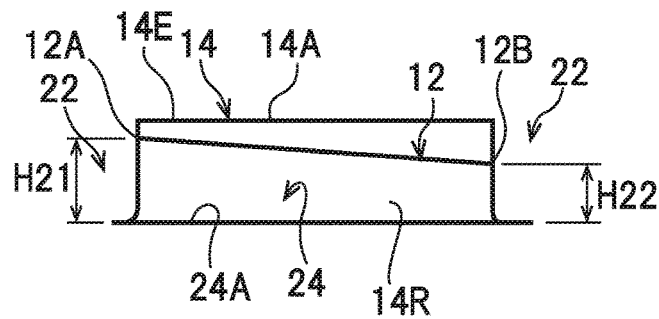
FIG. 2B is an end-on view illustrating a second step portion provided at a block, as viewed along arrow 2B in FIG. 2A.
Figure 2C:
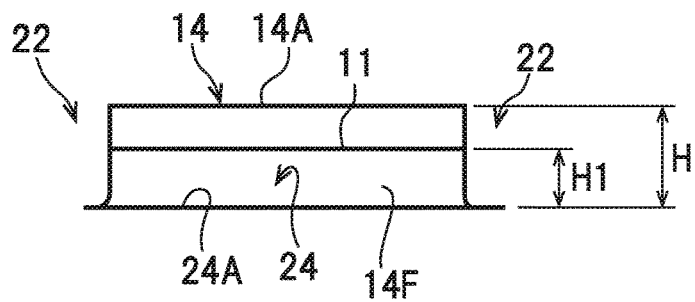
FIG. 2C is an end-on view illustrating a first step portion provided at a block, as viewed along arrow 2C in FIG. 2A.

In a pneumatic tire 20 of the present exemplary embodiment illustrated in FIG. 2A to FIG. 2C, the lateral main grooves 24 are inclined with respect to the tire width direction. The block 14 accordingly has a substantially parallelogram shape in plan view, and an acute angle portion 14E is provided at a position on the second step portion 12 side of the block 14 where an angle of intersection θ1 between the circumferential direction main groove 22 and the lateral main groove 24 on the kick-out side is an acute angle.

Widths W21, W22 of the second step portion 12 are such that one end 12A positioned on the acute angle portion 14E side is smaller than the other end 12B positioned on an opposite side from the acute angle portion 14E side. Specifically, in FIG. 2A, W21<W22 when the width of the one end 12A of the second step portion 12 is denoted W21 and the width of the other end 12B is denoted W22. The widths W21, W22 of the second step portion 12 are smaller than the (uniform) width W1 of the first step portion 11, such that W21<W22<W1 when compared against the width W1. The width of the second step portion 12 gradually decreases on progression from the other end 12B (width W22) toward the one end 12A (width W21). As an example, this change in width is linear; however it may also be on a curve.

The height of the second step portion 12 from the groove bottom 24A of the lateral main groove 24 where the side wall portion 14R on the kick-out side is present is higher at the one end 12A than at the other end 12B. Specifically, in FIG. 2B, H21>H22 when the height of the one end 12A is denoted H21, and the height of the other end 12B is denoted H22. Including the height H1 of the first step portion 11 illustrated in FIG. 2C, preferably H21>H22>H1. The height of the second step portion 12 gradually increases on progression from the other end 12B toward the one end 12A. As an example, this change in height is linear; however it may also be on a curve. As illustrated in FIG. 2C, the height H1 of the first step portion 11 is uniform.

Since other portions are similar to in the first exemplary embodiment, similar portions are allocated the same reference numerals, and explanation thereof is omitted.

Operation

Explanation follows regarding operation of the present exemplary embodiment configured as described above. In the pneumatic tire 20 according to the present exemplary embodiment illustrated in FIG. 2A to 2C, the block 14 includes the acute angle portion 14E. The width W21 of the one end 12A positioned on the acute angle portion 14E side of the second step portion 12 is set smaller than the width W22 of the other end 12B positioned on the opposite side from the acute angle portion 14E. This accordingly secures the rigidity of the acute angle portion 14E. The width of the second step portion 12 gradually decreases on progression from the other end 12B toward the one end 12A, giving a gentle change in the block rigidity along the second step portion 12. Specifically, there are no sudden changes in block rigidity in the range of the second step portion 12.

The height of the second step portion 12 from the groove bottom 24A of the main groove is set such that the height H21 of the one end 12A is higher than the height H22 of the other end 12B, further securing the rigidity of the acute angle portion 14E. The height of the second step portion 12 gradually increases on progression from the other end 12B toward the one end 12A, giving a gentle change in the block rigidity along the second step portion 12.

Accordingly, when traction or braking force acts on the pneumatic tire 20, deformation of the acute angle portion 14E of the block 14 is suppressed even when the block 14 is dragged against the road surface. This thereby enables heel-and-toe wear to be suppressed even when the block 14 includes the acute angle portion 14E.

Third Exemplary Embodiment

In a pneumatic tire 30 according to the present exemplary embodiment illustrated in FIG. 3A to FIG. 3E, the lateral main grooves 24 are inclined with respect to the tire width direction, and the main grooves extending in the tire circumferential direction, namely the circumferential direction main grooves 22, are inclined with respect to the tire circumferential direction. The block 14 is provided with an acute angle portion 14G at a position on a fourth step portion 34 side where an angle of intersection θ2 between the circumferential direction main groove 22 and the lateral main groove 24 is an acute angle. Respective tire width direction components arise at both tire width direction sides of the block 14 due to force received from the road surface when travelling. In consideration of this, a third step portion 33 and the fourth step portion 34 are provided in addition to the first step portion 11 and the second step portion 12 of the second exemplary embodiment.

Figure 3A:
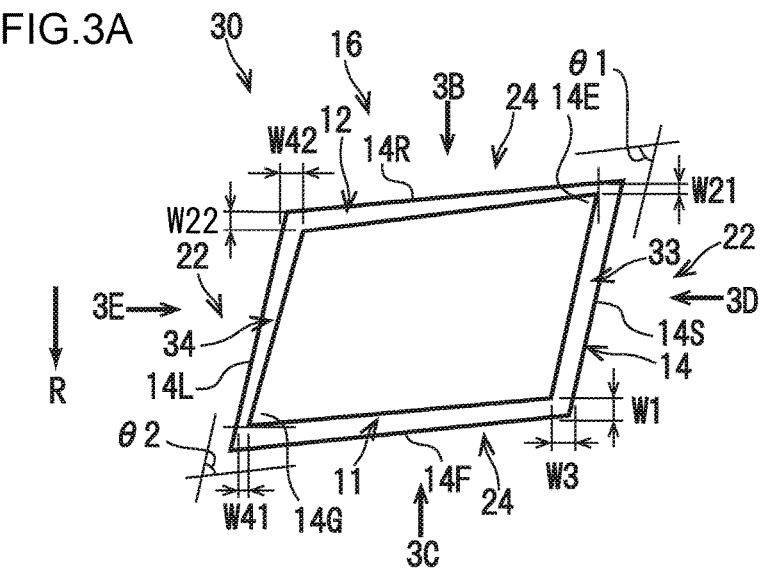
FIG. 3A is a plan view illustrating a block of a pneumatic tire according to a third exemplary embodiment.
Figure 3B:
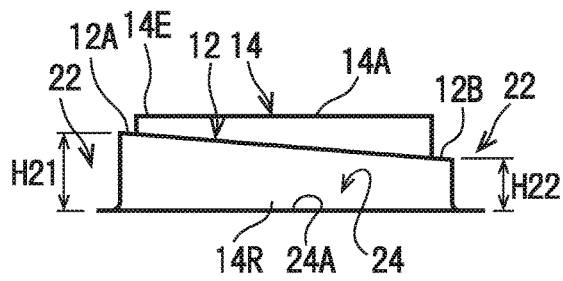
FIG. 3B is an end-on view illustrating a second step portion provided at a block, as viewed along arrow 3B in FIG. 3A.
Figure 3C:
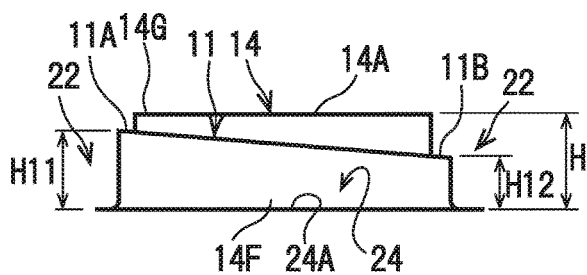
FIG. 3C is an end-on view illustrating a first step portion provided at a block, as viewed along arrow 3C in FIG. 3A.
Figure 3E:
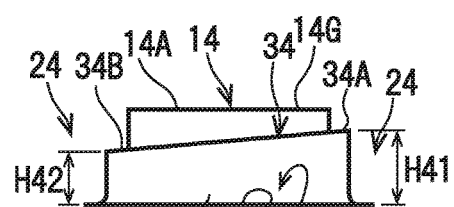
FIG. 3E is an end-on view illustrating a fourth step portion provided at a block, as viewed along arrow 3E in FIG. 3A.
Figure 3D:
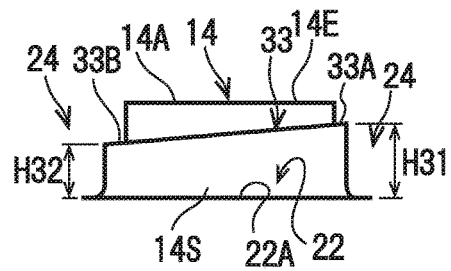
FIG. 3D is an end-on view illustrating a third step portion provided at a block, as viewed along arrow 3D in FIG. 3A.

As illustrated in FIG. 3A and FIG. 3D, the third step portion 33 extends along a wall portion 14S at one tire width direction side of the block 14. Heights H31, H32 from a groove bottom 22A of the circumferential direction main groove 22 where the one side wall portion 14S is present, which are lower than the tread face 14A and higher than the groove bottom 22A. Namely, in FIG. 3C and FIG. 3D, H31<H, and H32<H.

As illustrated in FIG. 3D, the height H31 is the height of one end positioned on the acute angle portion 14E side of the third step portion 33, and the height H32 is the height of the other end 33B positioned on the opposite side from the acute angle portion 14E. The height H31 is higher than the height H32, namely, H31>H32.

As illustrated in FIG. 3A and FIG. 3E, the fourth step portion 34 extends along a side wall portion 14L at another tire width direction side of the block 14. Heights H41, H42 from the groove bottom 22A of the circumferential direction main groove 22 where the other side wall portion 14L is present, which are lower than the tread face 14A and higher than the groove bottom 22A. Namely, in FIG. 3C and FIG. 3E, H41<H, and H42<H.

As illustrated in FIG. 3E, the height H41 is the height of one end 34A positioned on the acute angle portion 14G side of the fourth step portion 34, and the height H42 is the height of the other end 34B positioned on an opposite side from the acute angle portion 14G side. The height of the fourth step portion 34 from the groove bottom 22A is higher at the one end 34A than at the other end 34B. Namely, H41>H42. The height of the fourth step portion 34 from the groove bottom 22A gradually increases on progression from the other end 34B toward the one end 34A, giving a gentle change in the block rigidity along the fourth step portion 34. As an example, this change in height is linear; however it may also be on a curve.

The widths W41, W42 of the fourth step portion 34 are set smaller than the width W3 of the third step portion 33. Namely, W42<W3, and W41<W3. Specifically, in FIG. 3A and FIG. 3E, W41<W42 when the width of the one end 34A of the fourth step portion 34 is denoted W41, and the width of the other end 34B is denoted W42. Since the widths W41, W42 of the fourth step portion 34 are smaller than the (uniform) width W3 of the third step portion 33, when the width W3 is included, W41<W42<W3. The width of the fourth step portion 34 gradually decreases on progression from the other end 34B toward the one end 34A. As an example, this change in width is linear; however it may also be on a curve. In the cases of the third step portion 33 and the fourth step portion 34 extending along the circumferential direction main grooves 22, the respective widths refer to the widths in the tire width direction.

The width W3 of the third step portion 33 may be equal to the width W1 of the first step portion 11 as illustrated in FIG. 3A, or may be different to the width W1.

As illustrated in FIG. 3C, the height of the first step portion 11 from the groove bottom 24A is higher at one end 11A than at the other end 11B. Specifically, H11>H12 when the height of the one end 11A is denoted H11, and the height of the other end 11B is denoted H12. The height H32 of the other end 33B of the third step portion 33 illustrated in FIG. 3D is preferably higher than the height H12 of the other end 11B of the first step portion 11.

The heights H31, H32 of the third step portion 33, and the heights H41, H42 of the fourth step portion 34, from the groove bottom 22A, are each from 50% to 80% of the height H from the groove bottom 22A to the tread face 14A. Note that the lower limit is set at 50% since below this value, block rigidity becomes difficult to secure, and the upper limit is set at 80% since above this value, the increase in the volume of the circumferential direction main grooves 22 becomes small.

In the present exemplary embodiment, the one end 11A of the first step portion 11 is connected to the one end 34A of the fourth step portion 34, and the other end 11B is connected to the other end 33B of the third step portion 33. The one end 12A of the second step portion 12 is connected to one end 33A of the third step portion 33, and the other end 12B is connected to the other end 34B of the fourth step portion 34.

Since other portions are similar to in the first exemplary embodiment or the second exemplary embodiment, similar portions are allocated the same reference numerals, and explanation thereof is omitted.

Operation

Explanation follows regarding operation of the present exemplary embodiment configured as described above. In the pneumatic tire 30 according to the present exemplary embodiment illustrated in FIG. 3A to FIG. 3E, the block 14 of the tread 16 is provided not only with the first step portion 11 and the second step portion 12, but also with the third step portion 33 and the fourth step portion 34. This accordingly secures a greater volume for the circumferential direction main grooves 22 and the lateral main grooves 24, and increases the shear force from snow columns in the circumferential direction main grooves 22 and the lateral main grooves 24, thereby enabling snow performance to be secured.

The third step portion 33 and the fourth step portion 34 are provided at the side wall portions 14S, 14L on both tire width direction sides of the block 14, and the rigidity of the block 14 is secured on the fourth step portion 34 side. Moreover, the block 14 includes the acute angle portions 14E, 14G. The rigidity of the acute angle portion 14E is secured by the second step portion 12, and the rigidity of the acute angle portion 14G is secured by the fourth step portion 34. The width of the fourth step portion 34 gradually decreases on progression from the other end 12B toward the one end 12A, giving a gentle change in the block rigidity along the fourth step portion 34. Specifically, there are no sudden changes in block rigidity in the range of the fourth step portion 34. Moreover, the height of the fourth step portion 34 gradually increases on progression from the other end 34B toward the one end 34A, giving a gentle change in the block rigidity along the fourth step portion 34.

Accordingly, when traction or braking force acts on the pneumatic tire 30, deformation of the acute angle portion 14E of the block 14 is suppressed even when the block 14 is dragged against the road surface. Moreover, a tire width direction component arises in the block 14 due to force received from the road surface when travelling, and when, for example, the side of the one side wall portion 14S is the dig-in side, and the side of the other side wall portion 14L is the kick-out side, deformation on the fourth step portion 34 side (kick-out side) of the block 14 is suppressed. In particular, deformation of the acute angle portion 14G of the block 14 is suppressed. This thereby enables heel-and-toe wear of the pneumatic tire 30 to be suppressed.

Fourth Exemplary Embodiment

Figure 4:
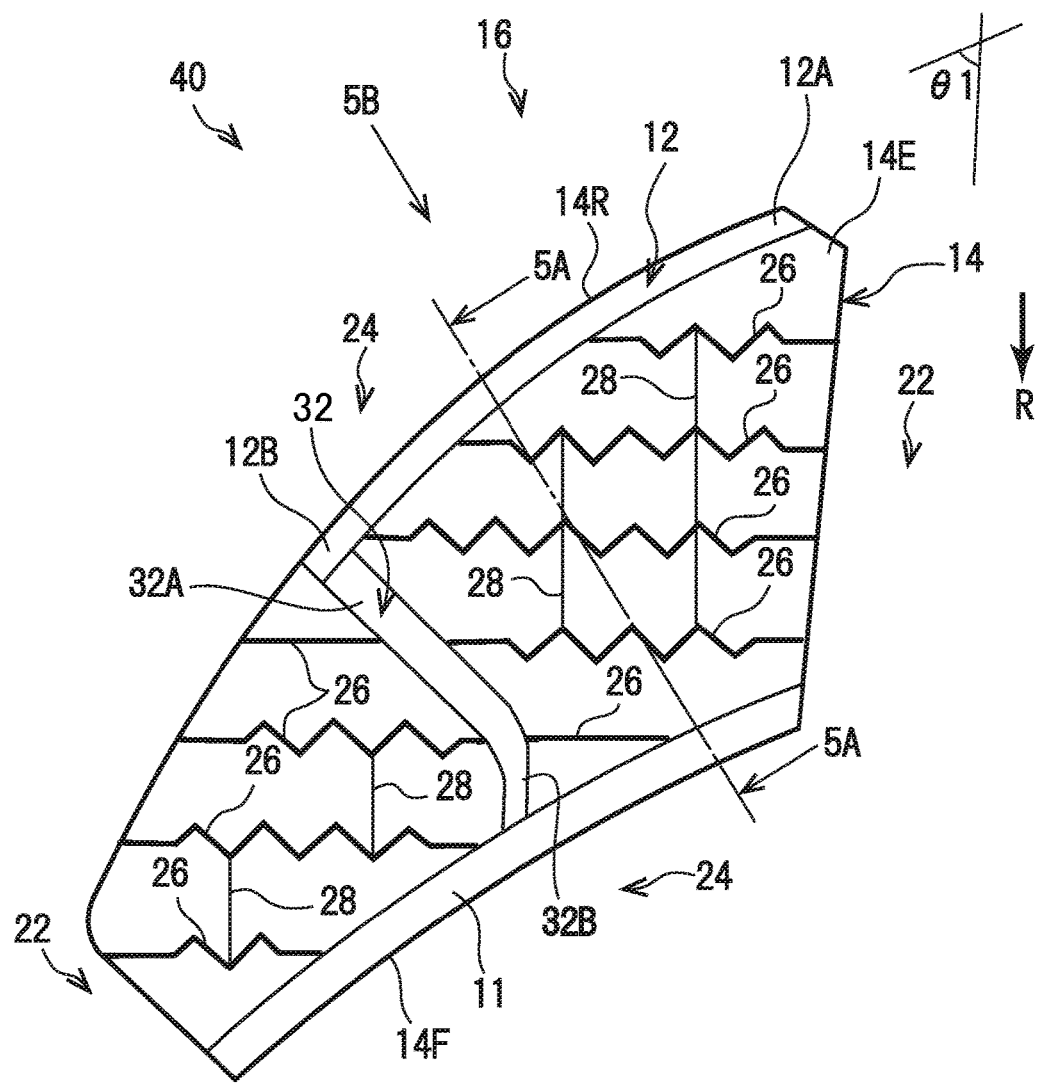
FIG. 4, FIG. 5A and FIG. 5B relate to a fourth exemplary embodiment.
Figure 5A:
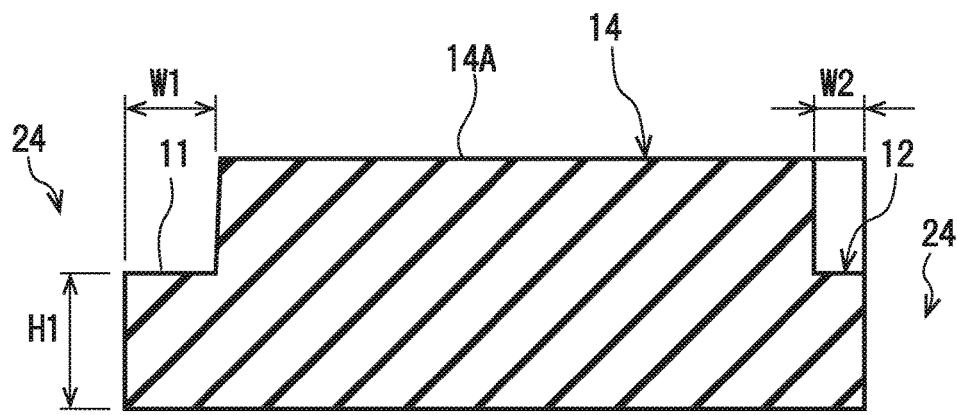
Figure 5B:
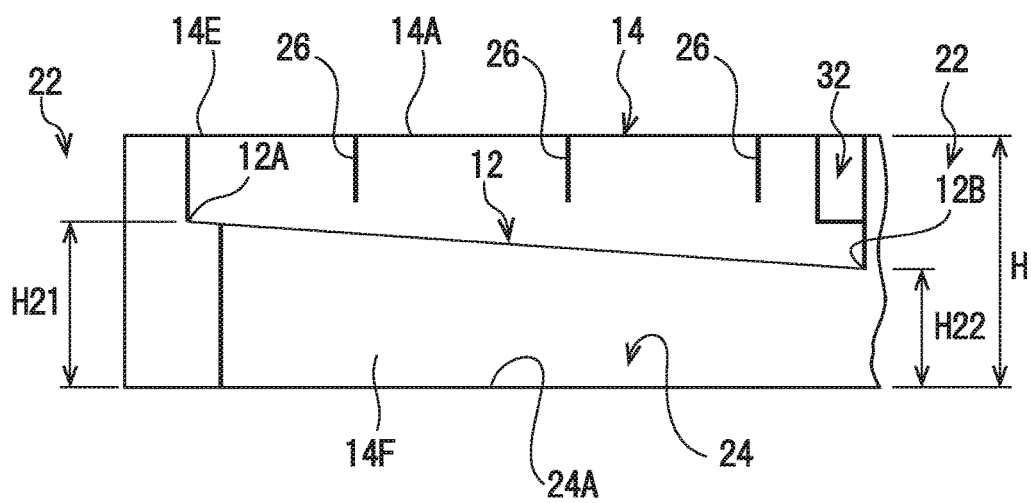

In a pneumatic tire 40 according to the present exemplary embodiment, a more specific configuration of the block 14 of the second exemplary embodiment is illustrated in FIG. 4, FIG. 5A and FIG. 5B. The block 14 is provided with plural sipes 26. The tread 16 is configured including foam rubber.

The sipes 26 are narrow grooves that open up when not in contact with the ground, and that close when in contact with the ground. The sipes 26 extend in the tire width direction, for example, and are locally formed with zigzag shapes.

In addition to the sipes 26, each block 14 is provided with longitudinal sipes 28 and a narrow groove 32 in order to balance the rigidity of respective portions of the block 14. The longitudinal sipes 28 extend around the tire circumferential direction, and cross the plural sipes 26. The narrow groove 32 is shallower than the circumferential direction main grooves 22 and the lateral main grooves 24, and crosses the block 14 to open onto the first step portion 11 and the second step portion 12 respectively. The narrow groove 32 includes an inclined portion 32A that is inclined with respect to the tire circumferential direction, and a straight portion 32B that extends in the tire circumferential direction. As illustrated in FIG. 5A and FIG. 5B, the groove bottom of the narrow groove 32 is, for example, at a higher position than the first step portion 11 and the second step portion 12. This is so as to secure handling stability performance on dry road surfaces.

The one end 12A of the second step portion 12 is positioned at the end portion on the acute angle portion 14E side of the block 14, and the other end 12B of the second step portion 12 is positioned at the opening of the narrow groove 32 onto the second step portion 12. Namely, the second step portion 12 is formed at a portion close to the acute angle portion 14E, rather than along the entire side wall portion 14R on the kick-out side. This is so as to secure braking performance on dry road surfaces. The first step portion 11 is formed along the entire side wall portion 14F on the dig-in side. Edge removal is only performed locally, so as not to excessively reduce the rigidity of a narrow portion of the block 14.

The acute angle portion 14E, where the block 14 is prone to low rigidity, is chamfered including at the one end 12A of the second step portion 12 to remove the corner.

Note that the sipes 26, 28 are omitted from illustration in FIG. 5A for simplicity.

Since other portions are similar to in the first exemplary embodiment, similar portions are allocated the same reference numerals, and explanation thereof is omitted.

Operation

Explanation follows regarding operation of the present exemplary embodiment configured as described above. The pneumatic tire 40 illustrated in FIG. 4 and FIG. 5A and FIG. 5B is provided with the plural sipes 26, thereby enabling snow performance to be further improved due to the edge effect thereof. The block 14 includes the inclined portion 32A and the straight portion 32B, thereby enabling shear force from snow columns to be secured within the narrow groove 32.

The tread 16 is moreover configured including foam rubber, thereby enabling improved driving performance on icy roads.

The first step portion 11 secures snow performance, and the second step portion 12 suppresses heel-and-toe wear, similarly to in the second exemplary embodiment.

Other Exemplary Embodiments

In the first exemplary embodiment, the height of the second step portion 12 is greater than or equal to the height of the first step portion 11; however there is no limitation thereto, and the height of the second step portion 12 may be lower than the height of the first step portion 11 as long as block rigidity on the second step portion 12 side is secured.

In the pneumatic tire 20 according to the second exemplary embodiment, the width of the second step portion 12 gradually decreases on progression from the other end 12B toward the one end 12A; however, there is no limitation thereto, and for example, the width may decrease in steps. Similar also applies to the width of the fourth step portion 34 in the third exemplary embodiment.

The height of the second step portion 12 is higher at the one end 12A than at the other end 12B. However, there is no limitation thereto, and the height of the second step portion 12 may be uniform. The height of the second step portion 12 gradually increases on progression from the other end 12B toward the one end 12A; however, there is no limitation thereto, and for example, the height may increase in steps. Similar also applies to the height of the fourth step portion 34 in the third exemplary embodiment.

The pneumatic tire 30 according to the third exemplary embodiment is provided with the first step portion 11, the second step portion 12, the third step portion 33, and the fourth step portion 34 around the periphery of the block 14; however, there is no limitation thereto. In cases in which, for example, the circumferential direction main grooves 22 have a greater angle of inclination with respect to the tire circumferential direction, and the one side wall portion 14S corresponds to the dig-in side and the other side wall portion 14L corresponds to the kick-out side, the third step portion 33 and the fourth step portion 34 may be provided alone, omitting the first step portion 11 and the second step portion 12. Moreover, the height of the fourth step portion 34 may be uniform.

In each of the exemplary embodiments, for example, approximately half of the plural blocks 14 provided at the tread 16 may be disposed facing in the other direction in the tire circumferential direction. So doing enables directionality of the tire to be avoided.

The configurations described in the respective exemplary embodiments may be combined and implemented as appropriate.

Test Examples

Tires according to Comparative Examples 1 to 5 and Examples 1 to 6 were fitted to an actual vehicle and tested respectively for snowy road traction performance, braking performance on dry road surfaces, and for heel-and-toe anti-wear performance. Details of each test are as follows.

Snowy Road Traction Performance

For snow traction performance, test vehicles fitted with the respective tires travelled over snow at a vehicle speed of 5 km/h, before pressing the accelerator to accelerate and measuring the time required for the vehicle speed to reach 40 km/h (acceleration time), with the inverse of the acceleration time evaluated employing an index in which Comparative Example 1 is set to 100. The higher the number, the shorter the acceleration time and the higher the snow traction performance.

Dry Road Surface Braking Performance

For dry road surface braking performance, test vehicles fitted with the respective tires travelled at 100 km/h over a dry road surface, and the inverse of the stopping distance with the brakes fully applied (mm) was evaluated employing an index in which a Comparative Example 1 is set to 100. The greater the value, the better the dry braking performance.

Heel-And-Toe Anti-Wear Performance

For heel-and-toe anti-wear performance, test vehicles fitted with the respective tires travelled for 2000 km at a constant speed of 60 km/h in various drive modes, on general roads in a dry state. For the presence or absence of heel-and-toe wear in the block, the block height on the kick-out side when new, and the block height on the kick-out side after wear were measured, and evaluation was made based on the difference between the heights. The smaller the difference in heights, the better the heel-and-toe anti-wear performance.

Comparative Example 1 is a structure in which the block 14 illustrated in FIG. 4 does not have step portions on either of the dig-in side or the kick-out side.

Comparative Example 2 is provided with step portions of equal width and height on the dig-in side and the kick-out side of the blocks. The height of the step portions is 60% of the height from the groove bottom of the main grooves to the tread face.

In Comparative Example 3, the height of a step portion on the kick-out side of the block from a reference of the groove bottom of a main groove is set to 48% of the height of the tread face.

In Comparative Example 4 the similar height of a step portion is set to 49% of the height of the tread face.

In Comparative Example 5, the similar height of a step portion is set to 81% of the height of the tread face.

Example 1 has the block 14 structure illustrated in FIG. 4. The height of the second step portion 12 on the kick-out side is 50% the height of the tread face 14A.

In Example 2, the similar height of a second step portion 12 is set to 51% the height of the tread face 14A.

In Example 3, the similar height of a second step portion 12 is set to 79% the height of the tread face 14A.

In Example 4, the similar height of a second step portion 12 is set to 80% the height of the tread face 14A.

Example 5 has a structure in which the width of the second step portion 12 is set such that the width of the one end 12A is smaller than the width of the other end 12B.

In Example 6, the shape of the first step portion 11 of the block 14 is modified. Specifically, as illustrated in FIG. 3C, the height of the first step portion 11 on the dig-in side is higher at the one end 11A than at the other end 11B.

The results are shown in Table 1. Snow traction performance and dry road surface braking performance are shown using an index in which Comparative Example 1 is set to 100. The heel-and-toe anti-wear performance is evaluated using the three grades A, B, and C. "A" means that heel-and-toe wear was not liable to occur, and wear was suppressed even when it did occur. "B" means that heel-and-toe wear was not liable to occur, however there was a high degree of wear when it did occur. "C" means that heel-and-toe wear occurred.

It can be seen from Table 1 that although Comparative Examples 2 to 5 exhibited improved dry road surface braking performance, there was a drop in snow traction performance, and the heel-and-toe anti-wear performance was evaluated as being poor. However, the tires according to Examples 1 to 6 not only exhibited snow traction performance and dry road surface braking performance equal to or better than that of Comparative Example 1, but heel-and-toe anti-wear performance was also evaluated highly.

TABLE 1

|  | Snow traction performance | Dry road surface braking performance | Heel-and-toe anti-wear performance |
|---|---|---|---|
| Comparative Example 1 | 100 | 100 | B |
| Comparative Example 2 | 90 | 108 | C |
| Comparative Example 3 | 98 | 115 | C |
| Comparative Example 4 | 98 | 115 | C |
| Comparative Example 5 | 95 | 110 | B |
| Example 1 | 108 | 99 | A |
| Example 2 | 108 | 99 | A |
| Example 3 | 100 | 108 | A |
| Example 4 | 100 | 108 | A |
| Example 5 | 105 | 105 | A |
| Example 6 | 108 | 108 | A |

The disclosure of Japanese Patent Application No. 2013-123098, filed on Jun. 11, 2013, is incorporated in its entirety by reference herein.

All cited documents, patent applications and technical standards mentioned in the present specification are incorporated by reference in the present specification to the same extent as if the individual cited document, patent application, or technical standard was specifically and individually indicated to be incorporated by reference.

EXPLANATION OF THE REFERENCE NUMERALS 10 pneumatic tire
11 first step portion
12 second step portion
12A one end
12B other end
14 block
14A tread face
14E acute angle portion
14F side wall portion
14G acute angle portion
14L side wall portion
14S side wall portion
14R side wall portion
16 tread
20 pneumatic tire
22 circumferential direction main groove (main groove)
22A groove bottom
24 lateral main groove (main groove)
24A groove bottom
26 sipe
30 pneumatic tire
33 third step portion
33A one end
33B other end
34 fourth step portion
34A one end
34B other end
40 pneumatic tire
W1 Width
W2 Width
W21 Width
W22 Width
W3 Width
W41 Width
W42 Width
θ1 angle of intersection
θ2 angle of intersection

The invention claimed is:

1. A pneumatic snow tire comprising:
a block that is provided at a tread, and that is demarcated by mutually intersecting main grooves respectively extending around a tire circumferential direction and along a tire width direction;
a first step portion that extends along one side wall portion at one tire circumferential direction side of the block, and that has a height from a groove bottom of one main groove extending along the tire width direction, where the one side wall portion is present, which is lower than a tread face and higher than the groove bottom of the one main groove extending along the tire width direction; and
a second step portion that extends along another side wall portion at another tire circumferential direction side of the block, that has a height from a groove bottom of another main groove extending along the tire width direction, where the another side wall portion is present, which is lower than the tread face and higher than the groove bottom of the another main groove extending along the tire width direction, and that has a smaller width than the first step portion; wherein:
an acute angle portion is provided at a position on the second step portion side of the block where an acute angle of intersection is formed between the main grooves;
the width of the second step portion is such that one end positioned on the acute angle portion side is smaller than another end positioned on an opposite side from the acute angle portion side; and
the height of the second step portion from the groove bottom is higher at the one end than at the another end.

2. The pneumatic tire of claim 1, wherein the height of the second step portion from the groove bottom is greater than or equal to the height of the first step portion.

3. The pneumatic tire of claim 1, wherein the width of the second step portion gradually decreases on progression from the another end toward the one end.

4. The pneumatic tire of claim 1, wherein the height of the second step portion from the groove bottom gradually increases on progression from the another end toward the one end.

5. The pneumatic tire of claim 1, wherein the height of the second step portion from the groove bottom is from 50% to 80% of a height from the groove bottom to the tread face.

6. The pneumatic tire of claim 1, wherein each main groove extending around the tire circumferential direction is inclined with respect to the tire circumferential direction, and the pneumatic tire further comprises:
a third step portion that extends along one side wall portion at one tire width direction side of the block, and that has a height from a groove bottom of one main groove extending around the tire circumferential direction, where the one side wall portion is present, which is lower than the tread face and higher than the groove bottom of the one main groove extending around the tire circumferential direction; and
a fourth step portion that extends along another side wall portion at another tire width direction side of the block, that has a height from a groove bottom of another main groove extending around the tire circumferential direction, where the another side wall portion is present, which is lower than the tread face and higher than the groove bottom of the another main groove extending around the tire circumferential direction, and that has a smaller width than the third step portion.

7. The pneumatic tire of claim 6, wherein:
an acute angle portion is provided at a position on the fourth step portion side of the block where an acute angle of intersection is formed between the main grooves; and
the width of the fourth step portion is such that one end positioned on the acute angle portion side is smaller than another end positioned on an opposite side from the acute angle portion side.

8. The pneumatic tire of claim 7, wherein the width of the fourth step portion gradually decreases on progression from the another end toward the one end.

9. The pneumatic tire of claim 7, wherein the height of the fourth step portion from the groove bottom is higher at the one end than at the another end.

10. The pneumatic tire of claim 9, wherein the height of the fourth step portion from the groove bottom gradually increases on progression from the another end toward the one end.

* * * * *